United States Patent [19]
Toth

[11] Patent Number: 5,242,662
[45] Date of Patent: Sep. 7, 1993

[54] SOLIDS RECYCLE SEAL SYSTEM FOR A FLUIDIZED BED REACTOR

[75] Inventor: Stephen J. Toth, Clinton Township, Hunterdan County, N.J.

[73] Assignee: Foster Wheeler Energy Corporation, Clinton, N.J.

[21] Appl. No.: 870,167

[22] Filed: Apr. 16, 1992

Related U.S. Application Data

[63] Continuation of Ser. No. 598,576, Oct. 15, 1990, abandoned, which is a continuation of Ser. No. 353,581, May 18, 1989, abandoned.

[51] Int. Cl.$^5$ .......................... B01J 8/36; F27B 15/08
[52] U.S. Cl. ..................... 422/142; 110/245; 122/4 D; 422/141; 422/145; 422/147; 431/7; 431/170
[58] Field of Search ........ 422/142, 141, 147, 145–146, 422/144; 34/57 A, 57 R; 110/243–245; 431/7, 170; 122/4 D

[56] References Cited

U.S. PATENT DOCUMENTS

| | | | |
|---|---|---|---|
| 3,236,607 | 2/1966 | Porter, Jr. et al. | 422/141 |
| 3,893,426 | 7/1975 | Bryers | 122/4 D |
| 4,253,425 | 3/1981 | Gamble et al. | 122/4 D |
| 4,459,133 | 7/1984 | Moss | 422/142 X |
| 4,469,050 | 9/1984 | Korenberg | 110/245 |
| 4,565,139 | 1/1986 | Sage et al. | 110/244 |
| 4,594,967 | 6/1986 | Wolowodiuk | 122/4 D |
| 4,617,877 | 10/1986 | Gamble | 122/4 D |
| 4,716,856 | 1/1988 | Beisswenger et al. | 122/4 D |
| 4,796,546 | 1/1989 | Herstad et al. | 110/245 |
| 4,813,479 | 3/1989 | Wahlgren | 110/245 |

Primary Examiner—Robert J. Warden
Assistant Examiner—Amalia Santiago
Attorney, Agent, or Firm—Marvin A. Naigur

[57] ABSTRACT

A fluidized bed reactor in which a sealing section is located within the reactor and adjacent a furnace section located in the reactor. A fluidized bed is formed in the furnace section and the sealing section. A mixture of flue gases and entrained particulate materials from the fluidized bed in the furnace section are separated and the separated particulate material is passed to the fluidized bed in the sealing section. When bed materials in the fluidized bed in the sealing section exceed a predetermined volume they are passed to the fluidized bed in the furnace.

11 Claims, 1 Drawing Sheet

SOLIDS RECYCLE SEAL SYSTEM FOR A FLUIDIZED BED REACTOR

This is a continuation of application Ser. No. 598,576, filed Oct. 15, 1990, abandoned, which is a continuation of application Ser. No. 353,581, filed May 18, 1989, abandoned.

BACKGROUND OF THE INVENTION

This invention relates to a fluidized bed reactor and a method of operating same and, more particularly, to such a reactor and method in which a solids recycle seal system is provided within the furnace section of the reactor.

Fluidized bed reactors, such as combustors, gasifiers, steam generators, and the like, are well known. In these arrangements, air is passed through a bed of particulate material, including a fossil fuel such as coal and a sorbent for the sulfur generated as a result of combustion of the coal, to fluidize the bed and to promote the combustion of the fuel at a relatively low temperature. The entrained particulate solids are separated externally of the bed and recycled back into the bed. The heat produced by the fluidized bed is utilized in various applications such as the generation of steam, which results in an attractive combination of high heat release, high sulfur capture, low nitrogen oxides emissions and fuel flexibility.

The most typical fluidized bed reactor is commonly referred to as a "bubbling" fluidized bed in which the bed of particulate material has a relatively high density and a well defined, or discrete, upper surface.

Other types of fluidized bed reactors utilize a "circulating" fluidized bed. According to these processes, the fluidized bed density is well below that of a typical bubbling fluidized bed, the air velocity is greater than that of a bubbling bed, and the flue gases passing through the bed entrain a substantial amount of particulate solids and are substantially saturated therewith. Circulating fluidized beds are also characterized by relatively high solids recycling which makes it insensitive to fuel heat release patterns, thus minimizing temperature variations, and therefore, stabilizing the emissions at a low level. The high solids recycling improves the efficiency of the mechanical device used to separate the gas from the solids for solids recycle, and the resulting increase in sulfur collection and fuel residence times reduces the sorbent and fuel consumption.

However, several problems do exist in connection with these types of fluidized bed reactors. For example, a sealing device such as a seal pot, a "J" valve, a syphon seal, a loop seal, an "L" valve, or similar device is required between the low pressure separator outlet and the higher pressure furnace section of the reactor to prevent a back flow of gases and solids from the furnace section to the outlet of the separator.

SUMMARY OF THE INVENTION

It is therefore an object of the present invention to provide a fluidized bed reactor and method for operating same which overcomes the aforementioned disadvantages of previous techniques.

It is a further object of the present invention to provide a reactor and method of the above type which eliminates the need for sealing devices between the separator and the furnace section of the reactor.

Toward the fulfillment of these and other objects, the fluidized bed reactor of the present invention includes a sealing section located within the furnace section of the reactor which contains a fluidized bed and shares a common wall with the lower portion of the furnace section. The flue gases and entrained particulate materials from the fluidized bed in the furnace section are separated and the separated particulate material is passed to the sealing section. Bed material in the sealing section is passed to the fluidized bed in the furnace when the volume of bed material in the sealing section exceeds a predetermined value.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing in which.

DESCRIPTION OF THE PREFERRED EMBODIMENT

Figure 1:
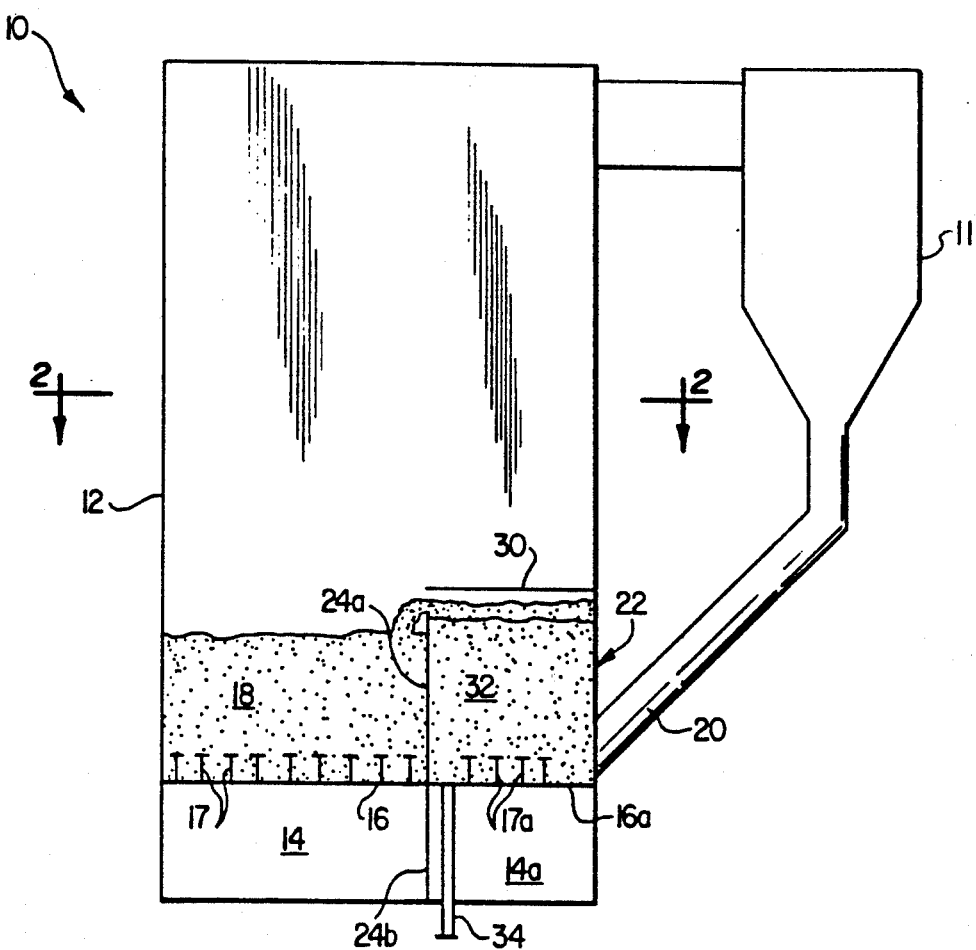
FIG. 1 is a schematic view depicting the system of the present invention.
Figure 2:
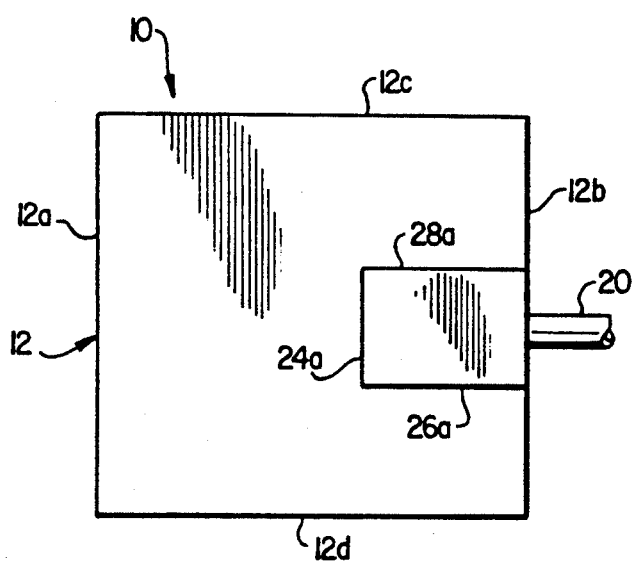
FIG. 2 is a cross-sectional view taken along the line 2—2 of FIG. 1.

Referring specifically to the drawing, the reference numeral 10 refers, in general, to a portion of a fluidized bed reactor which includes a furnace section formed by an upright enclosure 12 defined by four walls 12a, 12b, 12c and 12d. An air plenum 14 disposed at the lower end portion of the enclosure for receiving air from an external source. A furnace grid floor 16 is provided at the interface between the lower end of the enclosure 12 and the air plenum 14 and a plurality of fluidizing nozzles 17 are disposed on the floor 16 for allowing the pressurized air from the plenum to pass upwardly into the enclosure 10 for reasons to be described.

Supported on the floor 16 is a bed 18 of particulate material, consisting of coal and relatively fine particles of an sorbent material, such as limestone, for collecting the sulfur generated during the combustion of the coal, in a known manner. It is understood that one or more inlets (not shown) are provided through a wall of the enclosure for introducing the particulate material onto the bed, and a drain pipe (not shown) can be provided which extends through an opening in the floor 16 for discharging spent particulate material from the bed 18. The velocity of air from the plenum 14 passing into the enclosure is controlled so that it fluidizes the particulate material in the bed 18 to form a bubbling or circulating fluidized bed.

It is understood that the walls 12a, 12b, 12c and 12d of the enclosure 12 include a plurality of water tubes disposed in a vertically extending relationship and that flow circuitry (not shown) is provided to pass water through the tubes to convert the water to steam. Since the type of construction is conventional, the walls will not be described in any further detail.

It is also understood that the reactor 10 includes one or more separators 11 provided adjacent the enclosure 12 and connected thereto in a manner to receive the flue gases and entrained particulate material from the fluidized bed 18. Since the separator 11 is conventional and form no part of the present invention it is shown only schematically in the drawing.

The separator 11 receives the flue gases and entrained particulate material from the fluidized bed 18 in the enclosure 12 and operates in a conventional manner to disengage the particulate material from the flue gases due to the centrifugal forces created in the separator 11. The separated flue gases are then passed into and through a heat recovery area (not shown).

The separated particles from the separator 11 pass into an inlet nozzle 20 connected to the outlet of the separator 11. A sparger pipe (not shown), or similar air distribution devices, may be disposed in the inlet nozzle 20 to fluidize the solids as required. The inlet nozzle 20 extends into and through the lower rear wall portion of the enclosure 12 for discharging the separated particulate material into a sealing section disposed in the enclosure 12 and referred to in general by the reference numeral 22.

The sealing section 22 is defined by the enclosure wall 12b, three partitions 24, 26 and 28 and a roof 30. As better shown in FIG. 1, the partition 24 includes an upper section 24a extending from the floor 16 to a predetermined height in the enclosure 12 and a lower section 24b extending from the floor of the air plenum 14 to the floor 16. Although not clear from the drawings, it is understood that the partitions 26 and 28 include an upper section and a lower section in a similar manner. Thus, the partition sections 24a and 24b define a common wall between the furnace section of the reactor 10 and the sealing section 22. It is understood that the partitions 24, 26 and 28, including their respective upper and lower sections, as well as the roof 30, may be comprised of refractory, refractory or suitably lined air or water cooled material or combinations thereof, or can be formed by water tubes in the manner described in connection with the walls of the enclosure 12.

The sealing section 22 also includes an air plenum 14a and a floor 16a which are extensions of the air plenum 14 and the floor 16, respectively, and a plurality of fluidizing nozzles 17a extending above the floor 16a.

The separated particulate material from the inlet nozzle 20 is introduced to the interior of the sealing section 22 and builds up on the floor 16a to form a bed 32. An opening is provided in the upper portion of the partition section 24 to permit the particulate material to pass from the bed 32 to the bed 18 as will be described.

In operation, particulate fuel material and sorbent are introduced into the enclosure 12, as needed. Pressurized air from an external source passes into and through the air plenum 14, through the floor 16 and into the bed 18 of particulate material in the enclosure 12 to fluidize the material. The velocity of the air introduced, via the air plenum 14, through the floor 16 and into the interior of the enclosure 12 is established in accordance with the size of the particulate material so that either a bubbling or circulating fluidized bed is formed as discussed above.

A lightoff burner (not shown), or the like, is disposed in the enclosure 12 and is fired to ignite the particulate fuel material. When the temperature of the material reaches a relatively high level, additional fuel is discharged into the enclosure 12. The material in the enclosure 10 is self combusted and the mixture of air and gaseous products of combustion (hereinafter referred to as "flue gases") passes upwardly through the enclosure 12 and entrain, or elutriate, the relatively fine particulate material in the enclosure. The flue gases, with the entrained particulate material, pass to the upper portion of the enclosure 12 and exit into a cyclone separator 11 (not shown). In the separator 11, the solid particulate material is separated from the flue gases and the former passes into and through the inlet nozzle 20 and into the sealing section 22 to form the bed 32.

The particulate material from the inlet nozzle 20 builds up in the sealing section 22 until the height of the bed 32 reaches the height of the partition section 24a. When the volume of the material in the sealing section 22 is further increased, the material flows through the opening in the upper portion of the partition section 24a and onto the fluidized bed 18 in the furnace section of the reactor 10 where it mixes with the particulate material in the latter bed. Air is passed from an opening in the partition 24b or from an external source, into the plenum 14a and through the nozzles 17a, to fluidize the particulate material in the bed 32. The volume of the particulate material in the bed 32 combined with that in the inlet nozzle 20, both fluidized and defluidized, as required, serve to form a seal against backflow of flue gases from the furnace section to the particle separator 11 in a direction opposite from the normal system flow described above.

Water is passed through the walls of the enclosure 12 to exchange heat with the fluidized bed 18 and generate steam. The steam then passes through a heat recovery section (not shown) of the reactor before being discharged to external equipment such as a steam turbine.

It is thus apparent that the present invention eliminates the use of expensive sealing devices between the cyclone separator 11 solids outlet and the furnace section of the reactor, yet insures against the backflow of gases from the enclosure 12 to the outlet of the separator 11 through inlet nozzle 20.

It is understood that variations may be made in the foregoing without departing from the scope of the present invention. For example, the particular location of the sealing section 22 within the reactor 10 can be varied, such as by locating it at any elevation within the reactor. Also, the sealing section 22 may transfer solids from the bed 32 to the bed 18 through an outlet nozzle located in the partition sections 24a, 26a, or 28a, the roof 30, or the floor 16a. Also, the roof 30 of the sealing section 23 may be eliminated, and, the system for transferring the solids from the bed 32 to the bed 18 can be located totally outside the reactor. Also, the sealing section may contain individual isolation zones.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed reactor comprising a vessel; three partitions disposed substantially vertically in said vessel and extending upwardly from a perforated plate over a floor of said vessel to divide said vessel into a furnace section and a sealing section, said sealing section being defined by said three partitions, a portion of said perforated plate, and a portion of a wall of said vessel; means for establishing a fluidized bed of particulate material including fuel in said furnace section; means for establishing a separate fluidized bed of said particulate material in said sealing section, a top portion of said partitions of said sealing section being in fluid flow communication with said furnace section to permit said particulate material to pass from said sealing section to said furnace section; a conduit extending through said wall of said vessel for introducing particulate material from an external source through said wall and into a lower portion of said sealing section so that said particulate material may build up in said sealing section and in said conduit for preventing backflow of said particulate material from said furnace section through said conduit to said external source.

2. The reactor of claim 1 wherein said sealing section and said furnace section share a common floor.

3. The reactor of claim 2 wherein said means for establishing said fluidized bed in said furnace section comprises a plurality of nozzles extending from a portion of said common floor extending below said furnace section, and means for introducing a supply of gas to said latter nozzles.

4. The reactor of claim 2 wherein said means for establishing said fluidized bed in said sealing section comprises a plurality of nozzles extending from a portion of said common floor extending below said sealing section, and means for introducing a supply of gas to said latter nozzles.

5. A fluidized bed reactor comprising
an enclosure having a floor, a front and rear wall, and two opposing side walls;
a perforated distribution plate disposed in a lower portion of said enclosure and extending substantially horizontally across said enclosure to divided said enclosure into a plenum region extending between said distribution plate and said enclosure floor and a combustion region extending above said distribution plate;
a first partition extending upwardly from said distribution plate to a predetermined height in said combustion region to divide said combustion region into a furnace section and a seal section, said first partition comprising a first wall extending between and substantially parallel to said front and rear walls of said enclosure, and second and third walls extending between and substantially parallel to said enclosure side walls, said second and third walls each extending from said first wall to said rear wall of said enclosure so that said seal section is defined by said partition, a portion of said distribution plate, and a portion of said rear wall of said enclosure;
a second partition extending upwardly from said enclosure floor to said distribution plate to divide said plenum region into a first plenum chamber below said furnace section for fluidizing said furnace section and a second plenum chamber below said seal section for fluidizing said seal section;
means for introducing a particulate material into said furnace section;
means for introducing a first fluidizing gas into said first plenum for fluidizing said furnace section, said first fluidizing gas entraining a portion of said particulate material in said furnace section;
a conduit for introducing particulate material from an external source into a lower portion of said seal section so that said particulate material may build up in said seal section and in said conduit for preventing backflow of said particulate material through said conduit to said external source;
means for introducing a second fluidizing gas into said second plenum for fluidizing said seal section, said second fluidizing gas entraining a portion of said particulate material in said seal section; and
said seal section being in fluid flow communication with said furnace section so that said particulate material in said seal section may pass to said furnace section when said particulate material in said seal section exceeds said predetermined height of said first partition.

6. The reactor of claim 5 further comprising a seal section roof extending from said rear wall of said enclosure into said enclosure and above said first partition.

7. The reactor of claim 6 wherein said seal section roof extends substantially horizontally.

8. A fluidized bed reactor comprising
an enclosure having a floor, a front and rear wall and two side walls;
a perforated distribution plate disposed in a lower portion of said enclosure to divide said enclosure into a plenum region extending between said distribution plate and said enclosure floor and a combustion region extending above said distribution plate;
a first partition extending upwardly from said distribution plate to divide said combustion region into a furnace section and a seal section, said furnace section and said seal section being in fluid flow communication, said first partition comprising a first wall extending between and substantially parallel to said front and rear walls of said enclosure, and second and third walls extending between and substantially parallel to said enclosure side walls, said second and third walls each extending from said first wall to said rear wall of said enclosure so that said seal section is defined by said partition, a portion of said distribution plate, and a portion of said rear wall of said enclosure;
a second partition extending upwardly from said enclosure floor to said distribution plate to divide said plenum region into a first plenum chamber below said furnace section for fluidizing said furnace section and a second plenum chamber below said seal section for fluidizing said seal section;
means for introducing a particulate material into said furnace section;
means for introducing a first fluidizing gas into said first plenum for fluidizing said furnace section, said first fluidizing gas entraining a portion of said particulate material in said furnace section;
a separator connected to said enclosure and being in fluid flow communication with said furnace section for receiving said first fluidizing gas and said entrained particulate material from said furnace section and separating said first fluidizing gas from said entrained particulate material from said furnace section;
a conduit extending between said separator and said enclosure for passing said separated particulate material from said separator to said seal section in said enclosure; and
means for introducing a second fluidizing gas into said second plenum for fluidizing said seal section, said second fluidizing gas entraining a portion of said separated particulate material in said seal section.

9. The reactor of claim 8 further comprising a seal section roof extending from said rear wall of said enclosure into said enclosure and above said first partition.

10. The reactor of claim 9 wherein said seal section roof extends substantially horizontally.

11. The reactor of claim 8 wherein said conduit extends between said separator and said enclosure for passing said separated particulate material from said separator to a lower portion of said seal section so that said separated particulate material may build up in said seal section and in said conduit for preventing backflow of said separated particulate material through said conduit to said separator.

* * * * *